(12) United States Patent
Mebane, III

(10) Patent No.: US 10,318,359 B2
(45) Date of Patent: Jun. 11, 2019

(54) TECHNIQUES TO REMOTELY ACCESS OBJECT EVENTS

(71) Applicant: SAS INSTITUTE INC., Cary, NC (US)

(72) Inventor: Cummins Aiken Mebane, III, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 315 days.

(21) Appl. No.: 15/381,399

(22) Filed: Dec. 16, 2016

(65) Prior Publication Data

US 2017/0147415 A1 May 25, 2017

Related U.S. Application Data

(63) Continuation of application No. 13/898,423, filed on May 20, 2013, now abandoned, which is a continuation of application No. 12/858,748, filed on Aug. 18, 2010, now Pat. No. 8,464,281.

(51) Int. Cl.
*G06F 9/54* (2006.01)
*G06F 8/30* (2018.01)

(52) U.S. Cl.
CPC .............. *G06F 9/542* (2013.01); *G06F 8/315* (2013.01); *G06F 9/541* (2013.01); *G06F 2209/544* (2013.01)

(58) Field of Classification Search
None
See application file for complete search history.

(56) References Cited

U.S. PATENT DOCUMENTS

| | | | | |
|---|---|---|---|---|
| 5,446,901 A | * | 8/1995 | Owicki | G06F 12/0253 711/154 |
| 5,752,034 A | * | 5/1998 | Srivastava | G06F 8/70 717/130 |
| 5,758,351 A | * | 5/1998 | Gibson | G06F 9/465 |
| 5,802,367 A | * | 9/1998 | Held | G06F 9/445 719/332 |
| 6,044,409 A | * | 3/2000 | Lim | G06F 9/548 719/315 |
| 6,134,559 A | * | 10/2000 | Brumme | G06F 8/437 |
| 6,353,851 B1 | * | 3/2002 | Anupam | G06F 17/30873 707/E17.111 |
| 2004/0133445 A1 | * | 7/2004 | Rajan | G06F 8/20 717/108 |
| 2006/0143620 A1 | * | 6/2006 | Elms | G06F 9/465 719/315 |
| 2006/0225053 A1 | * | 10/2006 | Lakshman | G06F 8/437 717/140 |
| 2010/0319001 A1 | * | 12/2010 | Jones | G06F 9/4411 718/108 |

* cited by examiner

*Primary Examiner* — Shih-Wei Kraft

(57) ABSTRACT

Various embodiments are generally directed to techniques to remotely access object events. An apparatus may comprise a processor and a memory communicatively coupled to the processor. The memory may be operative to store a remote event bridge having a surrogate object that when executed by the processor is operative to allow an observer object for a first process to subscribe to an event of a subject object for a second process using the surrogate object. In this manner, the remote event bridge and the surrogate object operates as an interface between subject objects and observer objects without any modifications to either class of objects.

12 Claims, 8 Drawing Sheets

*Operating Environment 400*

200

```
RECEIVE A SUBSCRIPTION REQUEST FROM AN OBSERVER
OBJECT HAVING AN OBSERVER EVENT HANDLER, THE
SUBSCRIPTION REQUEST TO SUBSCRIBE TO AN OBJECT
EVENT OF A SUBJECT OBJECT
202
```

```
CREATE A SURROGATE OBJECT BY A REMOTE EVENT
BRIDGE, THE SURROGATE OBJECT HAVING A SURROGATE
EVENT HANDLER ARRANGED TO CALL THE OBSERVER
EVENT HANDLER
204
```

```
SUBSCRIBE THE SURROGATE OBJECT TO THE OBJECT
EVENT OF THE SUBJECT OBJECT USING THE SURROGATE
EVENT HANDLER
206
```

```
RECEIVE AN EVENT NOTIFICATION WHEN THE SURROGATE
EVENT HANDLER IS CALLED
208
```

```
CALL THE OBSERVER EVENT HANDLER IN RESPONSE TO
THE EVENT NOTIFICATION
210
```

*FIG. 2*

TECHNIQUES TO REMOTELY ACCESS OBJECT EVENTS

CROSS-REFERENCE OF RELATED APPLICATIONS

This application is a continuation of, claims the benefit of, and priority to U.S. patent application Ser. No. 13/898,423, filed May 20, 2013, which is a continuation of U.S. patent application Ser. No. 12/858,748, filed on Aug. 18, 2010 and issued as U.S. Pat. No. 8,464,281; the subject matter of both of the above are hereby incorporated by reference in their entireties.

BACKGROUND

Object-oriented programming (OOP) is a programming paradigm that uses objects to design software programs. An object may comprise a discrete set of data structures with a defined set of data fields, methods (functions or procedures), properties and events. Each object is capable of receiving messages, processing data, and sending messages to other objects. In other words, each object can be viewed as an independent "machine" with a distinct role or responsibility. As such, a software program may represent a collection of interacting objects.

Objects for a software program may be executed in a same process or different processes. A process is an instance of a software program that is being executed. Depending on an operating system, a process may be implemented as one or more threads of execution that execute instructions from the software program concurrently. In some cases, objects for a software program may be executed by different threads of a single process, or by different processes, on a single device. In other cases, objects for a software program may be executed by different processes on different devices, such as in a distributed computing environment.

Objects executed in different processes, or in some cases different threads of a single process, typically utilize some form of inter-process communication (IPC) to exchange data between the different processes. IPC techniques may include operations related to message passing, synchronization, shared memory, and remote procedure calls (RPC). Different IPC techniques may be used based on such factors as bandwidth and latency of communication between processes or threads of a process, and a type of data being communicated.

A class of IPC techniques may include RPC techniques. RPC techniques may be used to implement a programming concept referred to as "remoting." Remoting techniques may be used when different objects are implemented by different processes on different devices. Remoting allows a local object executing by a process on one device to access a remote object executing by another process on a different device. For instance, OOP and remoting techniques may be used as a programming model for web applications, such as Rich Internet Applications (RIAs). RIAs are a rapidly growing segment of the software industry. RIAs are web applications that have many of the characteristics of desktop applications, typically delivered either by way of a site-specific browser, via a browser plug-in, or independently via sandboxes or virtual machines. Users generally need to install a software framework using a computer operating system before launching an RIA. The software framework typically retrieves, updates, verifies and executes a given RIA.

Web applications such as RIAs utilize various types of remoting techniques. For instance, an RIA may implement objects in a browser as part of a user interface for a web service or web application executing objects on a server. A local object executed by the browser may remotely access certain features of a remote object executed by the web service or web application, such as passing data to the remote object for processing by a method of the remote object. However, conventional remoting techniques are typically limited as to which features of remote objects are accessible, and further, how to access features of remote objects in an efficient manner. It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to remotely access object events. Some embodiments are particularly directed to enhanced IPC techniques to remotely access events native to a remote object by other objects executing on separate threads or processes. In one embodiment, object events for a remote object may be accessed without any modifications to the remote object, thereby allowing software programs to utilize legacy objects as originally programmed.

In one embodiment, for example, an apparatus such as a computing device may comprise a processor and a memory communicatively coupled to the processor. The memory may be operative to store a remote event bridge having a surrogate object that when executed by the processor is operative to allow an observer object for a first process to subscribe to an event of a subject object for a second process using the surrogate object. In this manner, the remote event bridge and the surrogate object operates as an interface between subject objects and observer objects without any modifications to either class of objects. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 2 illustrates an embodiment of a logic flow for an IPC system.

DETAILED DESCRIPTION

Figure 1:
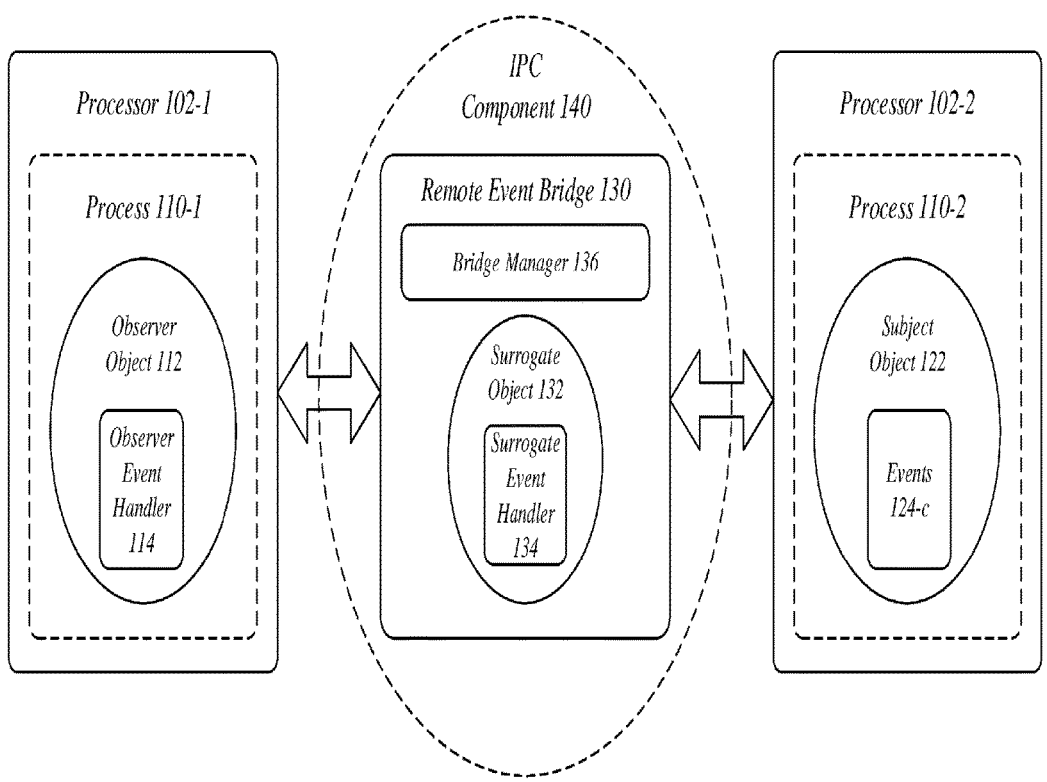
FIG. 1 illustrates an embodiment of an inter-process communication system.

Various embodiments are generally directed to techniques to remotely access object events. Some embodiments are particularly directed to enhanced IPC techniques to remotely access events native to a remote object by other objects executing on separate threads or processes. In one embodiment, object events for a remote object may be accessed without any modifications to the remote object, thereby allowing software programs to utilize legacy objects as originally programmed.

In various embodiments, enhanced IPC techniques may be implemented to allow one object to subscribe and communicate with another object. An object may generally comprise any entity that can be manipulated by the commands of a programming language, such as a value, variable, function, or data structure. In one embodiment, an object may comprise objects suitable for an OOP programming architecture, and in this context, may refer to a particular instance of a class.

In one embodiment, enhanced IPC techniques may be implemented to allow an observer object to remotely access object events for a subject object. An observer object may generally refer to any object subscribing to any features of another object, such as an object event of another object. A subject object may generally refer to any object granting a subscription to any features of the object, such as an object event of the object. In some cases, the subject object may also publish event notifications when an event occurs (or "fires"). A subject object may sometimes be referred to herein as a "remote object" or a "remoted object" since a subject object is remotely accessed by an observer object. Although certain embodiments may be described with reference to observer objects and subject objects, it may be appreciated that the enhanced IPC techniques may be implemented for any objects suitable for a given software program, software platform, software framework, or software architecture. The embodiments are not limited in this context.

In various embodiments, an observer object and a subject object may be executing on separate threads, processes and/or devices. In one embodiment, for example, each of the observer object and the subject object may be executing on different threads of a single process. In one embodiment, for example, each of the observer object and the subject object may be executing on different processes within a single electronic device. In one embodiment, for example, each of the observer object and the subject object may be executing on different processes, with each process implemented by different electronic devices.

Various embodiments implement various enhanced IPC techniques through a remote event bridge. A remote event bridge may refer to a software component designed to operate as an interface between observer objects and subject objects. A remote event bridge allows an observer object to access various object events for a subject object. In one embodiment, a remote event bridge may be implemented as a centralized software component within a process for an observer object or a subject object. In one embodiment, a remote event bridge may be implemented as a distributed software component with portions within each process for an observer object and a subject object.

Enhanced IPC techniques implemented by a remote event bridge provide several advantages over conventional IPC techniques. For instance, conventional IPC techniques may implement a client-server technique referred to as "push technology." Push technology is a communication model where a request for a given transaction is initiated by a publisher, such as a server computer (referred to sometimes as "server push"). Push technology may be contrasted with "pull technology" where a request is initiated by a subscriber, such as a client computer. However, push technology such as server push is typically uni-directional. By way of contrast, enhanced IPC techniques are bi-directional. Server push also requires server side configuration, whereas enhanced IPC techniques may work with any public events on any remote object. Further, server push requires a prearranged set of messages known to both sides. Enhanced IPC techniques may be used to remotely access subject objects without any proprietary messaging. In addition, server push is typically controlled by the server. Enhanced IPC techniques allow any observer objects to anonymously subscribe or unsubscribe to subject objects at runtime using a remote event bridge. Still further, server push generally calls a pre-designated method in a web application such as an RIA. Enhanced IPC techniques allow a RIA to dynamically specify at runtime a method to handle an object event. These and other advantages may be realized in OOP programming models utilizing a remote event bridge implementing one or more enhanced IPC techniques.

FIG. 1 illustrates a block diagram for an IPC system 100 designed to implement various enhanced IPC techniques for observer objects to access native object events for subject objects utilizing a remote event bridge. The IPC system 100 may be implemented as part of a computing system or communications system, examples of which are described in more detail with reference to respective FIGS. 7, 8. Although the IPC system 100 as shown in FIG. 1 has a limited number of elements in a certain topology, it may be appreciated that the IPC system 100 may include more or less elements in alternate topologies as desired for a given implementation.

In various embodiments, the IPC system 100 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

In various embodiments, the IPC system 100 may be implemented by one or more electronic devices each having computing and/or communications capabilities. Example computing devices may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a mainframe computer, a supercomputer, a network appliance, a web appliance, multiprocessor systems, processor-based systems, or any combination thereof. The embodiments are not limited in this context.

In various embodiments, components and/or modules of the IPC system 100, and any electronic devices implementing some or all of the components and/or modules of the IPC system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the IPC system 100 may be implemented as part of a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced IPC techniques, it may be appreciated that the enhanced IPC techniques may be implemented by a single computing device as well. The embodiments are not limited in this context.

The IPC system 100 may comprise or implement multiple elements, including one or more processors 102-a arranged to execute multiple processes 110-b. The one or more processors 102-a may also be arranged to execute an IPC component 140. The IPC component 140 may comprise or implement various enhanced IPC techniques utilizing a remote event bridge 130. The remote event bridge 130 may facilitate communications between the multiple processes 110-b allowing any objects executed by one of the multiple processes 110-b to subscribe to object events 124-c surfaced by any objects executed by another of the multiple processes 110-b, and vice-versa.

It is worthy to note that "a" and "b" and "c" and similar designators as used herein are intended to be variables representing any positive integer. Thus, for example, if an implementation sets a value for a=5, then a complete set of processes 110-a may include processes 110-1, 110-2, 110-3, 110-4 and 110-5. The embodiments are not limited in this context.

In the illustrated embodiment shown in FIG. 1, a processor 102-1 may execute an observer object 112 as part of a process 110-1. A processor 102-2 may execute a subject object 122 as part of a process 110-2. The objects 112, 122 may comprise or be implemented as any entity that can be manipulated by the commands of a programming language, such as a value, variable, function, or data structure. In one embodiment, the objects 112, 122 may represent objects suitable for an OOP programming architecture, and in this context, may refer to a particular instance of a class. Each of the objects 112, 122 may comprise a discrete set of data structures with a defined set of data fields, methods (functions or procedures), properties and/or events, and may be created using any suitable OOP programming language. Although a single observer object 112 and a single subject object 122 are shown in FIG. 1, it may be appreciated that any number of observer objects 112 and subject objects 122 may be used for a given implementation, such as any number of objects collectively operating as a web application or web service. Further, although the observer object 112 and the subject object 122 are illustrated as executed by respective processes 110-1, 110-2, it may be appreciated that the observer object 112 and the subject object 122 may be executed using different threads of a single process 110-b (e.g., 110-3). The embodiments are not limited in this context.

The IPC component 140 may implement the remote event bridge 130 to allow the observer object 112 executed by the process 110-1 to subscribe to one or more object events 124-c surfaced by the subject object 122 executed by the process 110-2. Each of the object events 124-c may comprise a piece of application-level information from an underlying programming framework, such as a graphical user interface (GUI) toolkit, for example. In one embodiment, the object events 124-c may comprise any events suitable for event-driven or event-based programming. Event driven systems are typically used when there is some asynchronous external activity that needs to be handled by a program. For example, asynchronous external activity may comprise a user who presses a button on their mouse. The outside activity causes an object event 124-c to occur (it fires), some outside hardware and or software will collect data about the object event 124-c, and when the program signals that it is ready to accept the object event 124-c, the object event 124-c will be dispatched to the program by invoking the appropriate subroutine to deal with the event, referred to as the event handler. An event handler is an asynchronous callback subroutine that handles inputs received in a program. Some exemplary object events 124-c may include without limitation key presses, mouse movements, action selections, timer expirations, file reads, messages, user actions, and any other defined events suitable for event-driven or event-based programming. The embodiments are not limited in this context.

In one embodiment, the processes 110-1, 110-2 may be executed by a same computing device. For instance, a single computing device may implement a multi-processor system having the processors 102-1, 102-2 arranged to execute the respective processes 110-1, 110-2. Alternatively, a single computing device may implement a single processor 102-3 executing both of the processes 110-1, 110-2. The embodiments are not limited in this context.

In one embodiment, the processes 110-1, 110-2 may be executed by different computing devices. For instance, one computing device may implement the processor 102-1 while another computing device implements the processor 102-2. The computing devices implementing the respective processors 102-1, 102-2 may communicate over a network, such as a public network (e.g., Internet) or a private network (e.g., Intranet). The embodiments are not limited in this context.

In one embodiment, the processes 110-1, 110-2 and associated objects may be implemented using different programming languages. For instance, the process 110-1 may comprise part of a RIA, such as a web application or web service of a service-oriented architecture (SOA) for deployment on a server computing device using various server side technologies, such as a JAVA PLATFORM ENTERPRISE EDITION™ (JAVA EE) programmed in the JAVA™ programming language, made by Oracle® Corporation, C, C++, C#, and so forth. The process 110-2 may also comprise part of a RIA, such as a front-end of a SOA for deployment on a web browser of a client computing device using various client side technologies, such as an Adobe Flash platform programmed in an object-oriented programming language such as ACTIONSCRIPT™ and ADOBE® FLEX, made by Adobe Systems Incorporated. It may be appreciated that these programming languages are provided by way of example and not limitation. One or more processes 110-$b$ may be implemented using any suitable programming language utilizing an OOP programming model.

The IPC component 140 may implement the remote event bridge 130 to allow the observer object 112 executed by the process 110-1 to subscribe to the object event 124-$c$ surfaced by the subject object 122 executed by the process 110-2. This may be accomplished, for example, using a publish/subscribe model. When the observer object 112 sends a subscription request to subscribe to the object event 124-$c$ of the subject object 122, a bridge manager 136 of the remote event bridge 130 intercepts the subscription request. The bridge manager 136 may be arranged to generate and manage a surrogate object 132 to service the subscription request. The surrogate object 132 may be designed to operate as an interface to communicate data between the observer object 112 and the subject object 122 without changing any of the structures or operations for the observer object 112 or the subject object 122. In one embodiment, for example, the surrogate object 132 of the remote event bridge 130 may subscribe to the object event 124-$c$ of the subject object 122 using a surrogate event handler 134. The surrogate object 132 may receive an event notification when the surrogate event handler 134 is called, and call an observer event handler 114 of the observer object 112 in response to the event notification. The remote event bridge 130 may be described in more detail with reference to FIG. 2.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 2 illustrates one embodiment of a logic flow 200. The logic flow 200 may be representative of some or all of the operations executed by one or more embodiments described herein. For instance, the logic flow 200 may be representative of some or all of the operations executed by the IPC component 140 and/or the remote event bridge 130.

In the illustrated embodiment shown in FIG. 2, the logic flow 200 may receive a subscription request from an observer object having an observer event handler, the subscription request to subscribe to an object event of a subject object at block 202. For example, the bridge manager 136 of the remote event bridge 130 may receive a subscription request from the observer object 112 having the observer event handler 114. The subscription request may comprise a request to subscribe to the object event 124-$c$ of the subject object 122.

The logic flow 200 may create a surrogate object by a remote event bridge, the surrogate object having a surrogate event handler arranged to call the observer event handler at block 204. For example, the bridge manager 136 of the remote event bridge 130 may intercept the subscription request, and create the surrogate object 132. The surrogate object 132 may have the surrogate event handler 134 arranged to call the observer event handler 114.

The logic flow 200 may subscribe the surrogate object to the object event of the subject object using the surrogate event handler at block 206. For example, the bridge manager 136 may subscribe the surrogate object 132 to the object event 124-$c$ of the subject object 122 using the surrogate event handler 134 on behalf of the observer object 112.

The logic flow 200 may receive an event notification when the surrogate event handler is called at block 208. For example, the surrogate object 132 may receive an event notification when the surrogate event handler 134 is called by the subject object 122. The subject object 122 may call the surrogate event handler 134 when the object event 124-$c$ subscribed to by the surrogate object 132 actually occurs (or "fires"). For instance, assume the object event 124-$c$ is a mouse-click. When the subject object 122 detects a mouse-click, such as for selecting a GUI element presented by a GUI view, the subject object may call the surrogate event handler 134.

The logic flow 200 may call the observer event handler in response to the event notification at block 210. For example, the surrogate object 132 may receive the event notification, and the surrogate event handler 134 may call the observer event handler 114 in response to the event notification. In this manner, the observer object 112 may receive the event notification from the subject object 122 via the surrogate object 132. This may occur transparently without the observer object 112 or the subject object 122 being aware of the remote event bridge 130 or the surrogate object 132.

Figure 3:
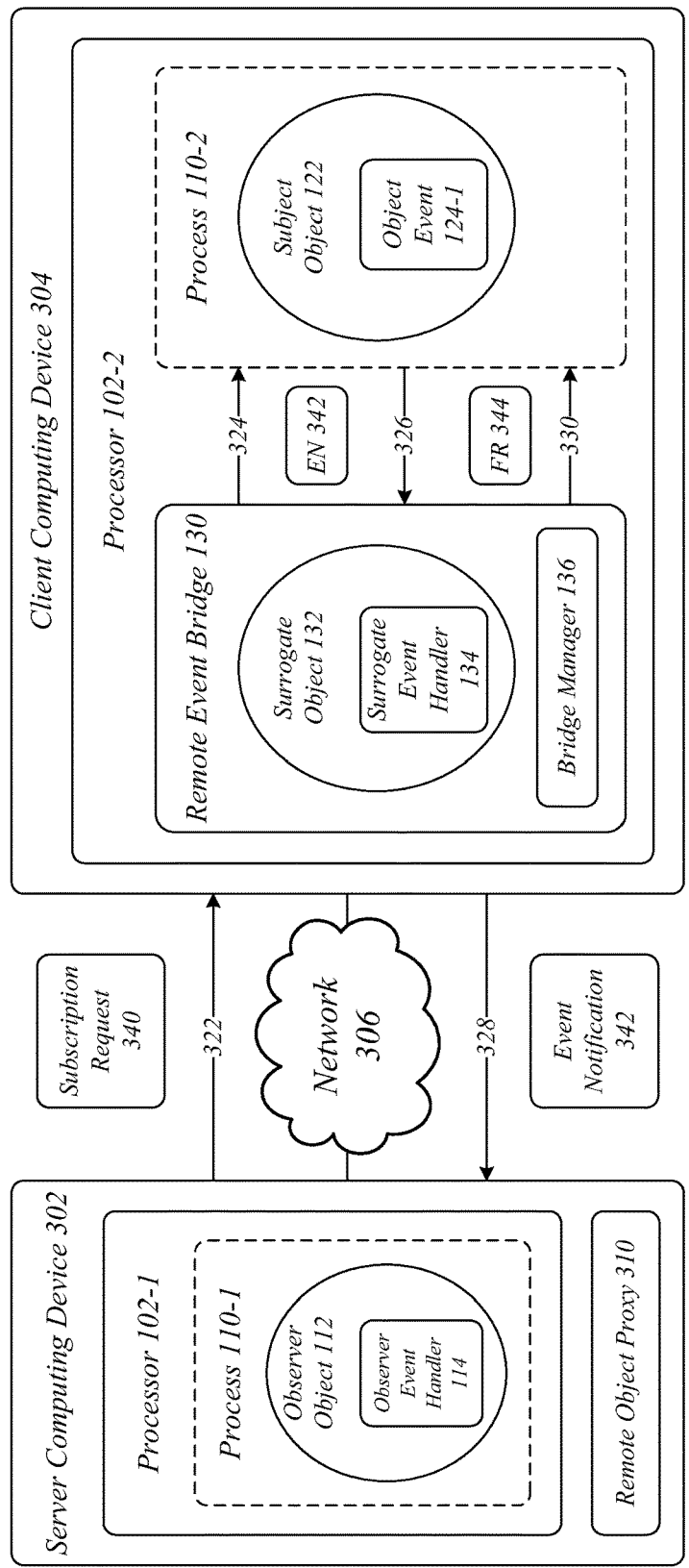
FIG. 3 illustrates an embodiment of a first operating environment.

FIG. 3 illustrates an embodiment of an operating environment 300 suitable for the IPC system 100. The operating environment 300 illustrates signaling and/or message flow between the various elements of the IPC system 100 to provide enhanced IPC techniques for subscribing to object events 124-$c$ of objects executed by heterogeneous processes 110-$b$.

In the illustrated embodiment shown in FIG. 3, the operating environment 300 may be implemented as a client-server architecture comprising a server computing device 302 and a client computing device 304. Each of the computing devices 302, 304 may implement a portion of the IPC system 100 as a distributed system. The server computing device 302 may implement the processor 102-1 for executing the process 110-1 with the observer object 112. The server computing device 302 may also implement a remote object proxy 310. The client computing device 304 may implement the processor 102-2 for executing the process 110-2 and the remote event bridge 130. Although the operating environment 300 illustrates the remote event bridge 130 implemented by the processor 102-2 of the client computing device 304, it may be appreciated that the remote event bridge 130 may be implemented by another processor of the client computing device 304. Further, although the operating environment 300 illustrates the remote event bridge 130 implemented by the processor 102-2 of the client computing device 304, it may be appreciated that the remote event bridge 130 may be implemented by the processor 102-1 (or another processor) of the server computing device 302.

The computing devices 302, 304 may each have computing resources to process digital information and communications resources to communicate digital information. The computing devices 302, 304 may communicate with each over a network 306. The network 306 may comprise a public network (e.g., the Internet) or a private network (e.g., an intranet). The computing devices 302, 304 may communicate with each other using various wired or wireless communications techniques. Computing aspects of the computing devices 302, 304 may be described in more detail with reference to FIG. 7. Communications aspects for the computing devices 302, 304 may be described in more detail with reference to FIG. 8.

The processes 110-1, 110-2 may interoperate to implement a RIA of a SOA. As shown, the observer object 112 may be executed as part of the process 110-1 by the processor 102-1 on the client computing device 304. For instance, the process 110-1 may comprise some or all of application logic (or business logic) for a RIA residing on the server computing device 302. The process 110-1 may be programmed in accordance with various programming languages, application platforms and application frameworks, including JAVA made by Oracle Corporation, COLDFUSION made by Adobe Systems, .NET made by Microsoft® Corporation, WebORB for .NET, Hypertext Preprocessor (PHP), Ruby, Python, Perl, Lisp, Dylan, Pike, Cluster (CLU), Smalltalk, Eiffel, Ruby on Rails (RoR), among other programming languages.

The subject object 122 may be executed as part of the process 110-2 by the processor 102-2 on the client computing device 304. For instance, the process 110-2 may comprise some or all of a user interface for a RIA implemented by a web browser. Examples of suitable web browsers may include MICROSOFT INTERNET EXPLORER®, GOOGLE® CHROME and APPLE® SAFARI, to name just a few. In one embodiment, the process 110-2 may be an RIA programmed using an ADOBE FLEX software development kit (SDK) and C#, among other programming languages.

The processes 110-1, 110-2 may communicate with each other over the network 306 utilizing various remoting techniques. For instance, the processes 110-1, 110-2 may communicate using simple object access protocol (SOAP). SOAP is a protocol specification for exchanging structured information to implement web services over a computer network. SOAP relies on extensible markup language (XML) as a message format. SOAP also relies on other application layer protocols, such as remote procedure call (RPC) and hypertext transfer protocol (HTTP), for message negotiation and transmission. SOAP can form a foundation layer of a web services protocol stack, providing a basic messaging framework upon which web services can be built. HTTP is an application layer request-response protocol specification for client-server computing. It may be appreciated that SOAP is merely an example and not a limitation, and any other communications protocols suitable for remoting (e.g., remote invocation or remote method invocation) consistent with the embodiments may be used for a given implementation. For instance, the processes 110-1, 110-2 may utilize an action message format (AMF) to communicate between an ADOBE FLASH application and a remote service over the network 306. In another example, the processes 110-1, 110-2 may utilize a real time messaging protocol (RTMP) to communicate between the processes 110-1, 110-2. In yet another example, the processes 110-1, 110-2 may utilize any number of transport protocols, including HTTP, transmission control protocol and internet protocol (TCP/IP), a real-time transport protocol (RTP), a real-time transport control protocol (RTCP), a user datagram protocol (UDP) and other transports to communicate between the processes 110-1, 110-2. The embodiments are not limited in this context.

The server computing device 302 may implement a remote object proxy 310 to facilitate remoting operations. The remote object proxy 310 may operate as a bridge to integrate various message protocols, such as AMF, with a native language for the subject object 122, such as JAVA or C#. Examples for the remote object proxy 310 may include without limitation Adobe BlazeDS, WebORB, and other server bridges. Additionally or alternatively, the client computing device 304 may implement a remote object proxy 310 for the remote event bridge 130 to interface with the surrogate object 132.

In the illustrated embodiment shown in FIG. 3, the observer object 112 may send a subscription request 340 to subscribe to the object event 124-1 of the subject object 122 via the remote object proxy 310 as indicated by arrow 322. The bridge manager 136 of the remote event bridge 130 may receive the subscription request 340 from the observer object 112. The bridge manager 136 may intercept the subscription request 340, and create the surrogate object 132. The surrogate object 132 may have the surrogate event handler 134 arranged to call the observer event handler 114. The bridge manager 136 may subscribe the surrogate object 132 to the object event 124-1 of the subject object 122 using the surrogate event handler 134 on behalf of the observer object 112 as indicated by arrow 324.

Once subscribed, the subject object 122 may call the surrogate event handler 134 when the object event 124-1 subscribed to by the surrogate object 132 actually fires, such as detecting a mouse-click for selecting a GUI element presented by a GUI view. The call may operate as an implicit event notification 342 for the surrogate event handler as indicated by arrow 326. The surrogate object 132 may receive the event notification 342, and the surrogate event handler 134 may call the observer event handler 114 in response to the event notification 342 as indicated by arrow 328. In this manner, the observer object 112 may receive the event notification 342 from the subject object 122 via the surrogate object 132. After the surrogate event handler 134 calls the observer event handler 114, the surrogate event handler 134 may send a function return 344 to the subject object 122 as indicated by arrow 330.

Figure 4:
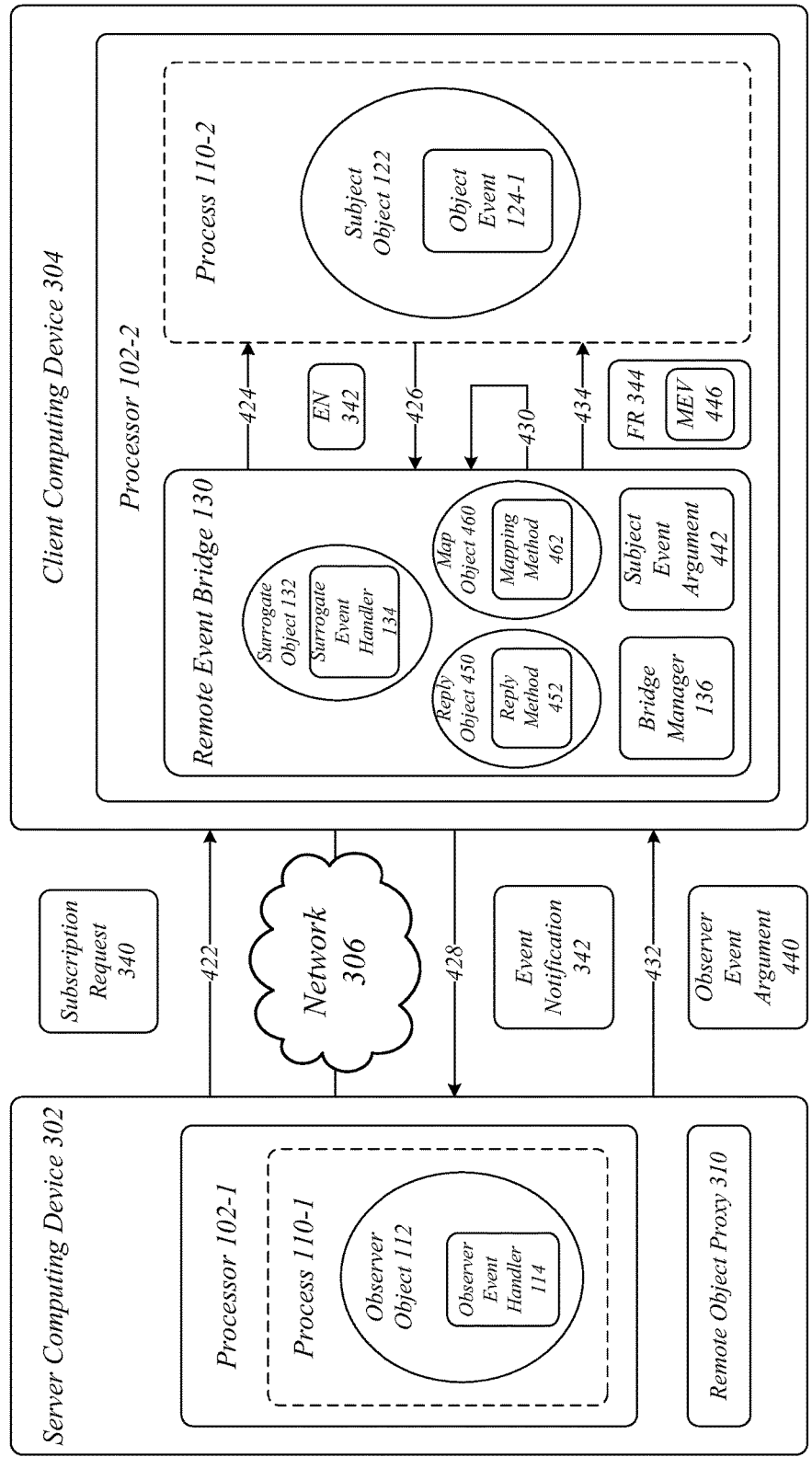
FIG. 4 illustrates an embodiment of a second operating environment.

FIG. 4 illustrates an embodiment of an operating environment 400 suitable for the IPC system 100. The operating environment 400 may be similar to the operating environment 300 as described with reference to FIG. 3. Further, the operating environment 400 illustrates an embodiment where the remote event bridge 130 passes event arguments between the observer object 112 and the subject object 122.

In addition to the observer object 112 transparently receiving the event notification 342 from the subject object 122 via the surrogate object 132, the remote event bridge 130 may also implement enhanced IPC techniques for passing event arguments between the observer object 112 and the subject object 122. This may be accomplished, for example, using additional objects for the remote event bridge, such as a reply object 450 and a map object 460.

When the bridge manager 136 of the remote event bridge 130 receives the subscription request 340 from the observer object 112, the remote event bridge 130 may generate the surrogate object 132. In addition, the bridge manager may also generate the reply object 450 and the map object 460. The reply object 450 may have a reply method 452 arranged to pass event arguments between the observer object 112 and the subject object 122. The map object 460 may have a mapping method 462 arranged to map information for one or more observer event arguments 440 received from the observer object 112 to one or more corresponding subject event arguments 442 of the subject object 122 to form mapped event arguments 446. The map object 460 may send the mapped event arguments to the subject object 122 as part of the function return 344.

In the illustrated embodiment shown in FIG. 4, the observer object 112 may subscribe to the object event 124-1 via the remote event bridge 130 using operations and messaging 422, 424, 426 and 428 corresponding to messaging 322, 324, 326 and 328 as described with the operating environment 300. Once subscribed, the subject object 122 may call the surrogate event handler 134 when the object event 124-1 subscribed to by the surrogate object 132 actually fires, such as detecting a mouse-click for selecting a GUI element presented by a GUI view. The surrogate object 132 may receive the event notification 342, and the surrogate event handler 134 may call the observer event handler 114 in response to the event notification 342 as indicated by arrow 428.

In the operating environment 400, however, rather than send the function return 344 to the subject object 122 after the surrogate event handler 134 calls the observer event handler 114, the surrogate event handler 134 may block the function return 344 to the subject object after the surrogate event handler 134 is called as indicated by arrow 430. The surrogate event handler 134 may then call the reply method 452 of the reply object 450. The reply method 452 may be arranged to pass event arguments between the observer object 112 and the subject object 122. The reply object 450 may receive the function call for the reply method 452, and execute the reply method 452 to wait for the arrival of the observer event arguments 440.

Once the observer object 112 receives the event notification 342 through calling of the observer event handler 114, the observer object 112 or another object executed by the process 110-1 may reply to the event notification 342 with information intended for the subject object 122 executed by the process 110-2. For instance, assume the application logic implemented by the server computing device 302 sends a response to the mouse-click of the object event 124-1, such as a request for security credentials for a user. The observer object 112 may generate a reply with one or more observer event arguments 440, and pass the observer event arguments 440 to the remote event bridge 130 as indicated by arrow 432.

The bridge manager 136 of the remote event bridge 130 may receive a reply from the observer object 112 having the one or more observer event arguments 440. The reply object 450 may call the mapping method 462 of the map object 460. The mapping method 462 may map information for one or more observer event arguments 440 received from the observer object 112 to one or more corresponding subject event arguments 442 of the subject object 122 to form one or more mapped event arguments 446. The mapping method 462 may pass the one or more mapped event arguments 446 to the surrogate object 132.

The surrogate object 132 may receive the one or more mapped event arguments 446, and unblock the function return 344 to the subject object 122. The surrogate object 132 may then send the one or more mapped event arguments 446 to the subject object 122 with the function return 344 for the subject object 122 as indicated by arrow 434. The subject object 122 may receive the one or more mapped event arguments 446 as input parameters and invoke a suitable method associated with the subject object 122 in accordance with the mapped event arguments 446.

Figure 5:
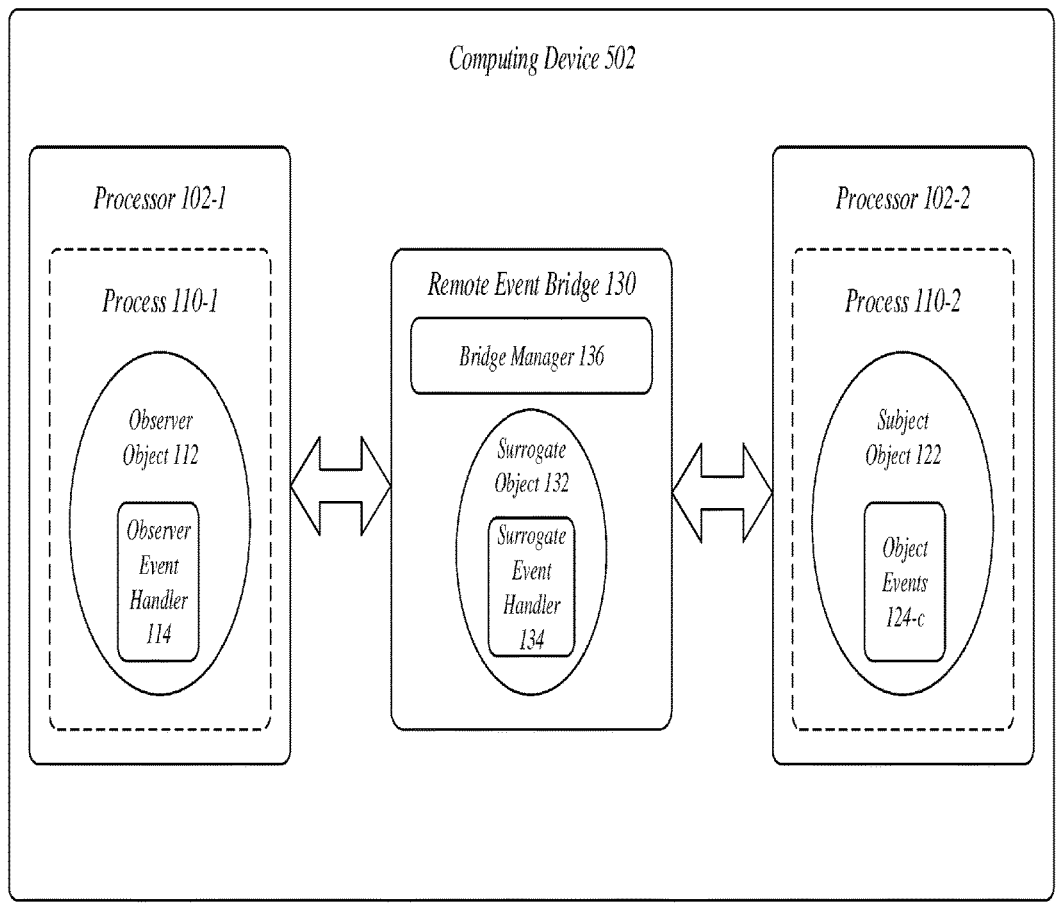
FIG. 5 illustrates an embodiment of a third operating environment.

FIG. 5 illustrates an embodiment of an operating environment 500 suitable for the IPC system 100. More particularly, FIG. 5 illustrates a block diagram of a computing device 502. The computing device 502 may comprise a centralized system arranged to implement all of the structure and/or operations for the IPC system 100 in a single computing entity. In one embodiment, for example, the computing device 502 may implement the structure and/or operations for the IPC system 100 entirely within a single computing device, rather than in a distributed system implementing the structure and/or operations for the IPC system 100 within the computing devices 302, 304 as described with reference to FIG. 3.

As previously described, in one embodiment the processes 110-1, 110-2 may be executed by a same computing device. In the illustrated embodiment shown in FIG. 5, the computing device 502 may comprise a multi-processor system having the processors 102-1, 102-2 arranged to execute the respective processes 110-1, 110-2. The remote event bridge 130 may be executed by either the processor 102-1, 102-2 as part of the respective processes 110-1, 110-2 as desired for a given implementation. Alternatively, the remote event bridge 130 may be executed by a separate processor (e.g., 102-3) and/or process (e.g., 110-3) as desired for a given implementation. The embodiments are not limited in this context.

Additionally or alternatively, the computing device 502 may implement processes 110-1, 110-2 in separate virtual systems, such as separate "sandboxes" or virtual machines. A sandbox is a security mechanism for separating running programs providing a tightly-controlled set of resources, such as scratch space on disk and memory. Access to other programs, networks, input/output (I/O) devices, and other resources provided by the computing device 502 may be restricted as well. A virtual machine is a software implementation of a machine (e.g., a computer) that executes programs like a physical machine. The embodiments are not limited in this context.

Figure 6:
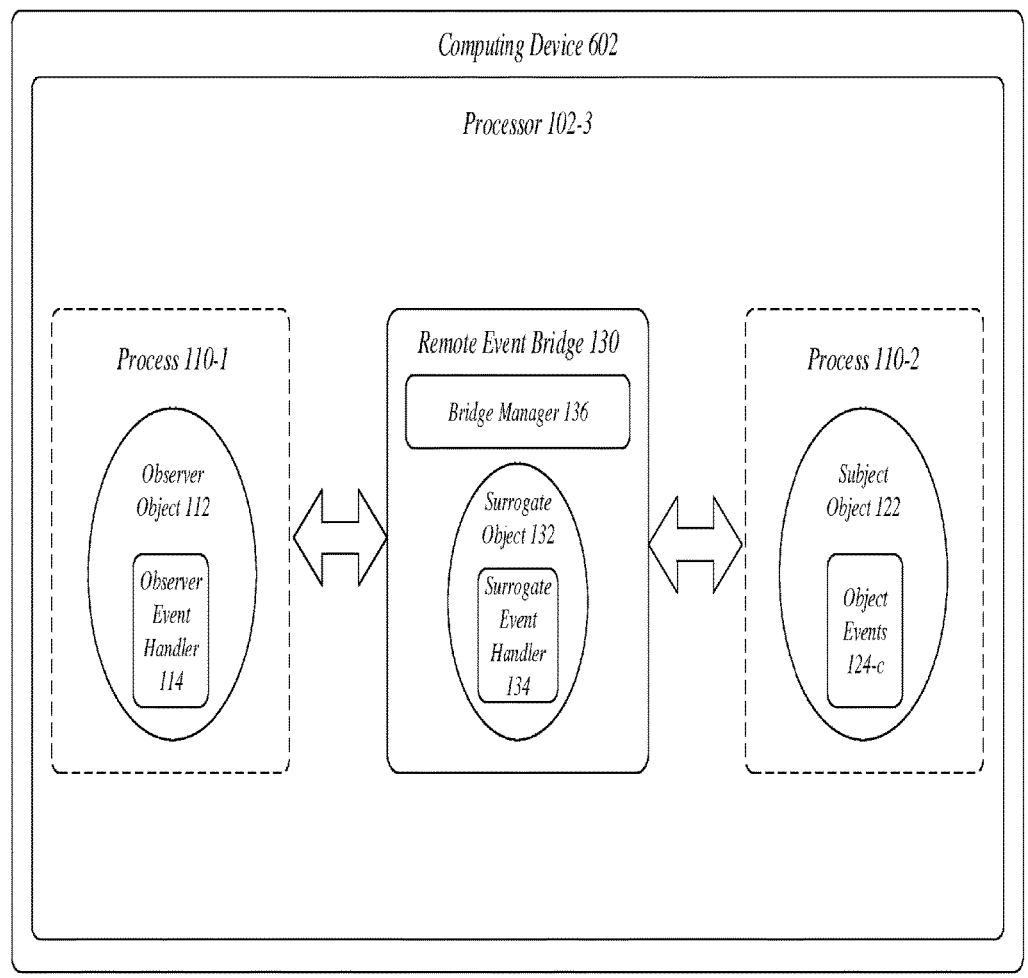
FIG. 6 illustrates an embodiment of a fourth operating environment.

FIG. 6 illustrates an embodiment of an operating environment 600 suitable for the IPC system 100. More particularly, FIG. 6 illustrates a block diagram of a computing device 602. The computing device 602 may comprise a centralized system arranged to implement all of the structure and/or operations for the IPC system 100 in a single computing entity. In one embodiment, for example, the computing device 602 may implement the structure and/or operations for the IPC system 100 entirely within a single computing device, rather than in a distributed system implementing the structure and/or operations for the IPC system 100 within the computing devices 302, 304 as described with reference to FIG. 3.

As previously described, in one embodiment the processes 110-1, 110-2 may be executed by a same computing device on a single processor. In the illustrated embodiment shown in FIG. 6, the computing device 602 may implement a single processor 102-3 executing both of the processes 110-1, 110-2. The remote event bridge 130 may be executed by the processor 102-3 as part of the process 110-1 or process 110-2 as desired for a given implementation. Alternatively, the remote event bridge 130 may be executed by a separate processor (e.g., 102-4) and/or process (e.g., 110-3) as desired for a given implementation. The embodiments are not limited in this context.

A more detailed implementation for the remote event bridge 130 may be further described using the following specific example. In general, the remote event bridge 130 may be implemented in any technology which supports object events, object remoting, a strong type system with reflection, a messaging protocol such as RMTP, and a RIA environment for the remote client. A reference implementation of the remote event bridge 130 may be implemented using the programming language C# in a .NET programming environment. Remoting services may be implemented using WebORB to form a bridge between a Flex AMF3 message format and the native programming language C# implemented for the objects 112, 122. The object 122 is part of a software program developed in ADOBE FLEX. The reference implementation of the remote event bridge 130 defines the object events 124-c to be in the standard .NET form of:

public event EventHandler<TEventArgs>EventName

It is worthy to note, however, that this implementation could be extended to work with any event signature.

In the reference implementation of the remote event bridge 130, the remote event bridge 130 utilizes two objects. The first object represents the bridge manager 136 and is called "RemoteEventBridge." As previously described, the bridge manager 136 is a remotable object to subscribe to an object event 124-c. The second object represents the surrogate object 132 and is called "RemoteEventSurrogate." As previously described, the surrogate object 132 is an internal object to manage a subscription.

In the reference implementation of the remote event bridge 130, an object event 124-c may be consumed using the following call:

public void Subscribe(string ObjectName, string EventName, string HandlerName, bool WaitForReply), where ObjectName is a fully qualified name of the object, EventName is a name of the event, HandlerName is a name of an RIA method to be called for handling the event, and WaitForReply is server code to wait for data to be returned in the event argument.

If a remote RIA client wishes to return data via a writable property in the event arguments, as described by the operating environment 400 with reference to FIG. 4, the following call may be used:

public void Reply(string EventName, EventArgs ea)

where EventName is a name of the event, and ea are event arguments (derived from the .Net EventArgs class)

The enhanced IPC techniques in general, and the remote event bridge 130 in particular, may have various use scenarios. One particular use scenario is for providing user notification when a remotely executing job is completed. These jobs are typically generated on a mid-tier and sent to a server for execution by a proprietary language processor. Since these jobs could take anywhere from one second to several days to complete, polling is an inefficient technique for determining job completion. The remote event bridge 130 allows the delivery of an OnJobComplete event from a .NET object in the mid-tier to a Flex client running in a Flash/web browser. When the Flex client receives the event a suitable user interface notifies the user while updating the job status.

Another usage for the remote event bridge 130 in the same application is informing the user of when certain actions take place. For example, a user could add a comment to a document owned by another user. If Flex client code subscribes to a SystemNotify event in the .NET mid-tier, then a real time notification can be presented to the user, informing them that a comment has been added to their document.

Yet another usage for the remote event bridge 130 is returning information. During the course of application logic execution on the mid-tier, a situation can arise in which additional information is required from the user. In a desktop application this is easily handled by an event which in turn is fielded by a user interface component to gather the information from the user and return it to the point of execution where it is required. Such a scenario, however, may be quite difficult to handle in a RIA. The remote event bridge 130 solves this problem not only by allowing the event to be handled in the remote Flex client, but also by its ability to return data to the event from the remote handler. Such functionality is not possible in existing publish-subscribe implementations or server messaging services.

Note that each of these examples assumes that standard .NET C# objects are used without modification. While a publish-subscribe technique could be theoretically used in an attempt to handle the second use case, most implementations work at a server level rather than an object level. The remote event bridge 130 offers object level granularity which is not possible with typical publish-subscribe mechanisms.

The enhanced IPC techniques and the remote event bridge 130 may be implemented for any software program, and may be particularly useful for RIA programs such as web services and web applications. In one embodiment, the remote event bridge 130 may be implemented for an RIA program referred to as SAS Guided Analysis (SGA), made by SAS® Institute Inc., of Cary, N.C. SGA is a RIA written in Flex which utilizes a highly interactive graphical user interface to expose SAS analytics to users with a novice level statistical background. Since the SAS computational process is essentially batch oriented with a highly variable execution time, it is very desirable to provide the user with a notification when the results are available. Such a mechanism is typically unavailable in existing browser-based applications.

SGA addresses this need by using the remote event bridge 130 to subscribe to a JobCompleted event on an ExecutionService object in a .NET mid tier. When a SAS job has completed, the remote event bridge 130 receives the event and remotes it to the SGA Flex client. The interface is updated with results from the job and other related status information. This presents the user with near instant feedback when the SAS job processing has completed resulting in a good interactive user experience.

Another feature in SGA which utilizes the remote event bridge 130 is the notification mechanism. There are several occurrences in an SGA system that are of interest to one of more connected users. One example is when a project owned by one user is modified by another user. Another example is when a user connects or disconnects from the SGA system. Each of these notifications is handled by the SGA Flex client which subscribes to a SystemNotify event on a RemoteSession object in the .NET mid tier. Unlike the typical publish-subscribe mechanism where a client application receives all messages of a particular type, the remote event bridge 130 subscribes to an event at an object level rather than a server level. Therefore a user would receive events only on the instance of an object to which they have subscribed. Since there is a RemoteSession object for each connected user, the user would only receive events intended for their particular SGA session. By way of contrast, a typical publish-subscribe mechanism would require client side filtering. However, the remote event bridge 130 delivers events to the intended subscriber independent of all other subscribers. This aspect is a key benefit of the remote event bridge 130.

Another example of enhanced user experience which may be attributed to the remote event bridge 130 is related to the days of terminal based computing. If a user was logged on to a system from a given terminal and wanted to logon from another terminal at different location, the second logon would typically be rejected. The alternatives were to have someone physically present at the first terminal to log the user off or call the system administrator to force a logoff from the first terminal with a privileged system command. The SGA has a much better user experience for this scenario. The mid-tier RemoteSession object has a SessionMoved event which is remoted to the Flex client user interface via the remote event bridge 130. If a user is working in an SGA session and moves to another computer without logging out, they may simply logon at the new location. The mid-tier code recognizes the user has an active session, connects the new Flex client to the existing session, and sends the event to the original Flex client via the remote event bridge 130. The original Flex client disables the user interface and issues a message that the session has moved to another computer. It is worthy to note that this is a relatively seamless operation and requires no action from an additional person or an IT support department. The remote event bridge 130 allows an object level subscription to the user's RemoteSession object which makes this user experience possible. A traditional server level publish-subscribe mechanism is typically unable to provide this functionality.

Instant real time notification and event remoting provide a large benefit for the user experience of a RIA. The remote event bridge 130 not only allows delivery of object events to a thin client user interface such as Flex, but such events are delivered to a specific user. This targeted delivery is typically not possible to address in a server-based publish-subscribe mechanism. On the development side there is another large benefit since object events may be remoted without modification or configuration. This allows development of objects which may be transparently targeted for desktop or mid-tier usage. The object event mechanism may be consumed from a remote client without special consideration by using the remote event bridge 130. This significantly reduces development costs and complexity. Further, any object which is configured for binary object remoting is also eligible for public event subscription via the remote event bridge 130 without additional server configuration. This aspect benefits IT personnel by substantially reducing deployment and configuration requirements of an n-tier application. Other use scenarios and benefits exist for the remote event bridge 130, and these are merely a few illustrative examples and not meant to be an exhaustive list of use scenarios and benefits.

The ability to use a remote object event from a RIA is a very compelling feature which compliments object remoting. By working with an object event without modification, the remote event bridge protects code investment since the object may be used in multiple environments such as a server or a desktop application. Existing technology allows a server push of data to a remote client but does not support the event construct supported by many languages such as C# and JAVA. The remote event bridge 130 allows a RIA such as a Flex client to use an event in the same manner as in-process code without modification or additional server configuration.

Figure 7:
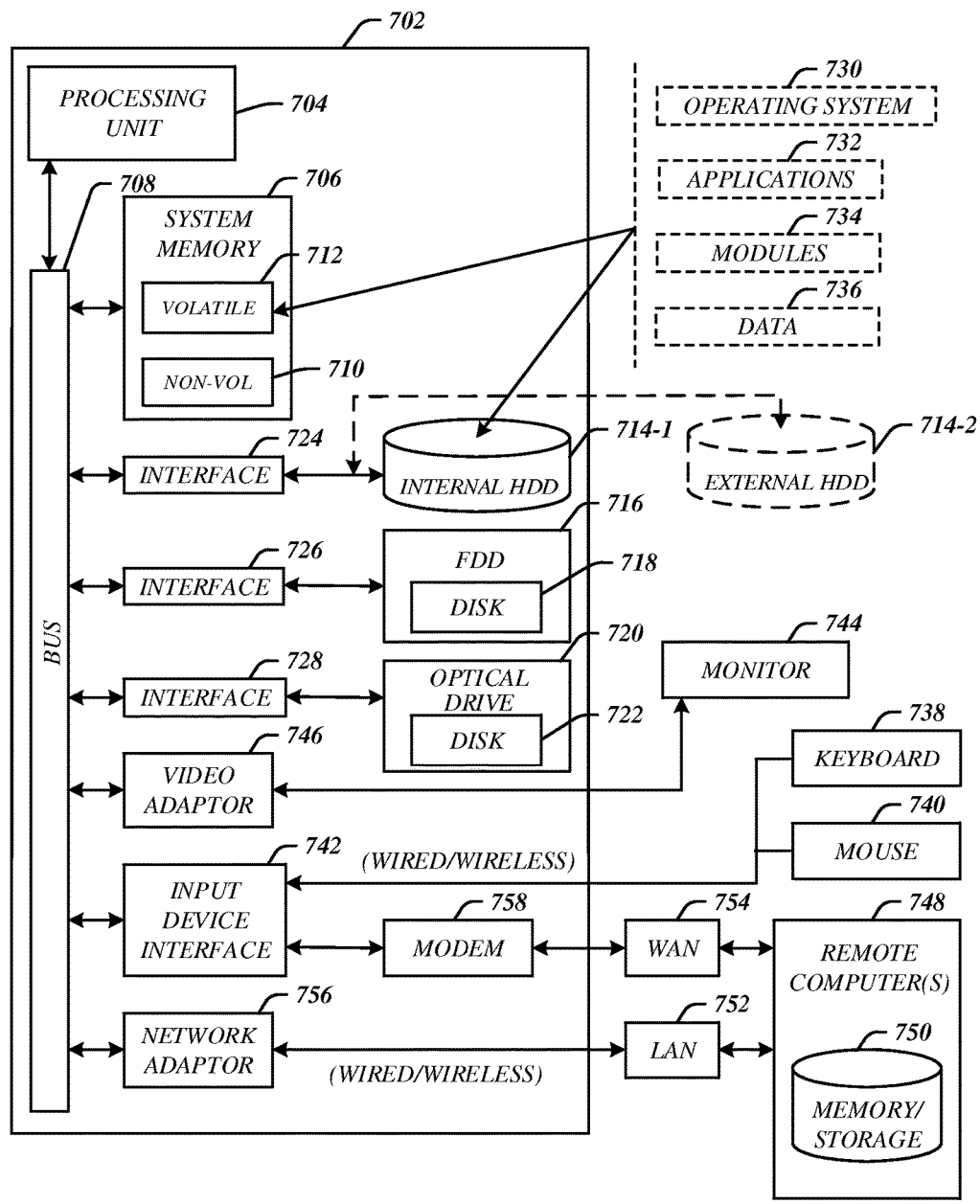
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714-1, a magnetic floppy disk drive (FDD) 716 to read from or write to a removable magnetic disk 718, and an optical disk drive 720 to read from or write to a removable optical disk 722 (e.g., a CD-ROM or DVD). In some embodiments, the computer 702 may be coupled with an external HDD 714-2. The internal HDD 714-1, the external HHD 714-2, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the IPC system 100, the IPC component 140, the remote event bridge 130, and other software elements described with the embodiments.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
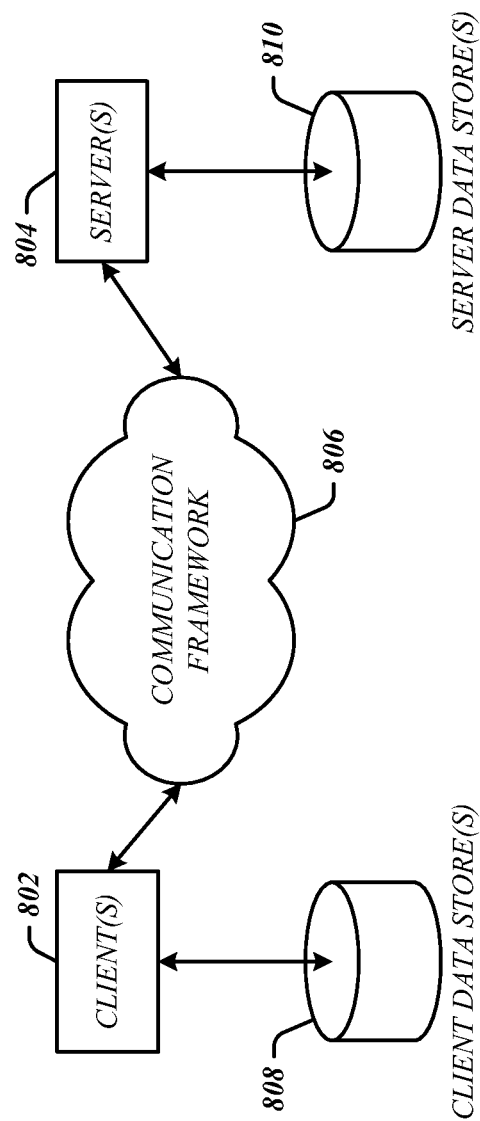
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client computing device 304. The servers 804 may implement the server computing device 302. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:

receiving, by a subject object operable by a processor of a mid-tier, a subscription request from an observer object operable by a second processor of a computer device, the subscription request received via a bridge manager of a remote event bridge subscribing a surrogate object to an object event of the subject object to receive event notifications for the object event out-of-process via a surrogate event handler of the remote event bridge, and wherein the computer device and the mid-tier are different devices;

receiving, by the subject object, an indication of an occurrence of the object event from a server;

sending, by the subject object, an event notification to the observer object out-of-process via calling the surrogate event handler of the remote event bridge, the event notification to notify the observer object of the occurrence of the object event, and the remote event bridge to enable notification of the occurrence of the object event out-of-process without changing any structures or operations for the observer object and the subject object from the structures or operations used for in-process notification;

sending, by the subject object, one or more subject event arguments to the remote event bridge for mapping with one or more observer event arguments;

receiving a function return having information from the observer object via the surrogate object, the function return received in response to the surrogate object receiving the information in the one or more observer event arguments from the observer object, the information received, by the subject object, as one or more mapped event arguments in the function return, the one or more mapped event arguments based on a mapping between the one or more observer event arguments and the one or more corresponding subject event arguments.

2. The computer-implemented method of claim 1, comprising receiving, by the subject object, the subscription request to subscribe to the object event of the subject object during runtime via the remote event bridge.

3. The computer-implemented method of claim 1, the indication received from the server based on a completion of a job generated at the mid-tier and processed by a proprietary language processor of the server.

4. The computer-implemented method of claim 1, wherein the observer object and the subject object are implemented in different programming languages.

5. An apparatus, comprising:
a processor of a mid-tier; and
logic operable by the processor of the mid-tier and at least partially implement a subject object to:
receive a subscription request from an observer object operable by a second processor of a computer device, the subscription request received via a bridge manager of a remote event bridge subscribing a surrogate object to an object event of the subject object to receive event notifications for the object event out-of-process via a surrogate event handler of the remote event bridge, and wherein the computer device and the mid-tier are different devices;
receive an indication of an occurrence of the object event from a server;
send an event notification to the observer object out-of-process via calling the surrogate event handler of the remote event bridge, the event notification to notify the observer object of the occurrence of the object event, and the remote event bridge to enable notification of the occurrence of the object event out-of-process without changing any structures or operations for the observer object and the subject object from the structures or operations used for in-process notification;
send one or more subject event arguments to the remote event bridge for mapping with one or more observer event arguments;
receive a function return having information from the observer object via the surrogate object, the function return received in response to the surrogate object receiving the information in the one or more observer event arguments from the observer object, the information received as one or more mapped event arguments in the function return, the one or more mapped event arguments based on a mapping between the one or more observer event arguments and the one or more corresponding subject event arguments.

6. The apparatus of claim 5, the logic to receive the subscription request to subscribe to the object event of the subject object during runtime via the remote event bridge.

7. The apparatus of claim 5, the indication received from the server based on a completion of a job generated at the mid-tier and processed by a proprietary language processor of the server.

8. The apparatus of claim 5, wherein the logic is implemented in a different programming language than the observer object.

9. At least one non-transitory computer-readable storage medium comprising instructions that when executed cause a processor of a mid-tier to:
receive, by a subject object operable by the processor, a subscription request from an observer object operable by a second processor of a computer device, the subscription request received via a bridge manager of a remote event bridge subscribing a surrogate object to an object event of the subject object to receive event notifications for the object event out-of-process via a surrogate event handler of the remote event bridge, wherein the computer device and the mid-tier are different devices;
receive, by the subject object, an indication of an occurrence of the object event from a server;
send, by the subject object, an event notification to the observer object out-of-process via calling the surrogate event handler of the remote event bridge, the event notification to notify the observer object of the occurrence of the object event, and the remote event bridge to enable notification of the occurrence of the object event out-of-process without changing any structures or operations for the observer object and the subject object from the structures or operations used for in-process notification;
send, by the subject object, one or more subject event arguments to the remote event bridge for mapping with one or more observer event arguments;
receive a function return having information from the observer object via the surrogate object, the function return received in response to the surrogate object receiving the information in the one or more observer event arguments from the observer object, the information received, by the subject object, as one or more mapped event arguments in the function return, the one or more mapped event arguments based on a mapping between the one or more observer event arguments and the one or more corresponding subject event arguments.

10. The non-transitory computer-readable storage medium of claim 9, comprising instructions that when executed cause the processor to receive, by the subject object, the subscription request to subscribe to the object event of the subject object during runtime via the remote event bridge.

11. The non-transitory computer-readable storage medium of claim 9, the indication received from the server based on a completion of a job generated at the mid-tier and processed by a proprietary language processor of the server.

12. The non-transitory computer-readable storage medium of claim 9, wherein the observer object and the subject object are implemented in different programming languages.

* * * * *